US008385299B2

(12) United States Patent
Tay

(10) Patent No.: US 8,385,299 B2
(45) Date of Patent: *Feb. 26, 2013

(54) PRIVATE NETWORK COMMUNICATION TERMINAL AND METHOD FOR REALIZING PRIVATE NETWORK COMMUNICATION

(75) Inventor: Wanfook Tay, Shenzhen (CN)

(73) Assignee: Hytera Communications Corp., Ltd., Shenzhen (CN)

(*) Notice: Subject to any disclaimer, the term of this patent is extended or adjusted under 35 U.S.C. 154(b) by 304 days.

This patent is subject to a terminal disclaimer.

(21) Appl. No.: 12/672,638

(22) PCT Filed: Sep. 28, 2008

(86) PCT No.: PCT/CN2008/072597
§ 371 (c)(1),
(2), (4) Date: Feb. 8, 2010

(87) PCT Pub. No.: WO2010/034164
PCT Pub. Date: Apr. 1, 2010

(65) Prior Publication Data
US 2011/0216746 A1    Sep. 8, 2011

(51) Int. Cl.
*H04B 7/212* (2006.01)
(52) U.S. Cl. .............. 370/337; 370/347; 370/442
(58) Field of Classification Search .......... 370/321, 370/326, 336–337, 345, 347, 442, 498, 350, 370/503; 709/225–226, 250
See application file for complete search history.

(56) References Cited

U.S. PATENT DOCUMENTS

| 5,363,373 | A | 11/1994 | Nakahara et al. | |
|---|---|---|---|---|
| 5,748,621 | A | 5/1998 | Masuda et al. | |
| 5,978,367 | A * | 11/1999 | Kinnunen et al. | 370/337 |
| 2003/0091019 | A1* | 5/2003 | Takano | 370/345 |
| 2006/0013188 | A1* | 1/2006 | Wiatrowski et al. | 370/347 |
| 2008/0165759 | A1* | 7/2008 | Khoo et al. | 370/347 |
| 2008/0186943 | A1* | 8/2008 | Wiatrowski et al. | 370/347 |
| 2009/0219916 | A1* | 9/2009 | Bohn | 370/347 |
| 2011/0026514 | A1* | 2/2011 | Tay | 370/350 |
| 2012/0002684 | A1* | 1/2012 | Tay | 370/503 |

FOREIGN PATENT DOCUMENTS

| CN | 1136752 A | 11/1996 |
|---|---|---|
| CN | 1606246 A | 4/2005 |
| EP | 0486692 A1 | 5/1992 |
| RU | 2302090 C2 | 6/2007 |

OTHER PUBLICATIONS

Russian Decision on Grant of a Patent for Invention regarding Application No. 2010104236/07(006001), dated Aug. 2, 2011. Translation provided by Unitalen Attorneys at Law.
ETSI TS 102 361-1 V1.4.5. Dec. 2007.

* cited by examiner

*Primary Examiner* — Jeffrey M Rutkowski
(74) *Attorney, Agent, or Firm* — Harness, Dickey & Pierce, P.L.C.

(57) ABSTRACT

The present invention relates to communication technologies and provides a private network communication terminal and a method for realizing private network communication, In the invention, one private network communication can only be performed in one time slot with a fixed location in a DMR TDMA frame, so that other mobile communication terminals that do not participate in the private network communication can determine an unoccupied time slot in advance, thereby they can initiate a new private network communication with the unoccupied time slot.

8 Claims, 6 Drawing Sheets

PRIVATE NETWORK COMMUNICATION TERMINAL AND METHOD FOR REALIZING PRIVATE NETWORK COMMUNICATION

CROSS-REFERENCE TO RELATED APPLICATIONS

This application is a U.S. National Stage Application of International application No. PCT/CN2008/072597, filed Sep. 28, 2008. The disclosure of the above applications is incorporated herein by reference.

FIELD OF THE INVENTION

The present invention relates to private network communication technologies, and in particular, to a private network communication terminal and a method for realizing private network communication.

BACKGROUND OF THE INVENTION

DMR (Digital Mobile Radio) standard is an European standard issued by ETSI (European Telecommunications Standards Institute) for replacing analog PMR (Private Mobile Radio). It has various advantages, such as large coverage area, high transmission rate, high frequency spectrum efficiency and good energy saving effect. As a result, mobile communication products based on DMR standard has a good market prospect.

DMR standard employs a TDMA frame structure with two time slots. FIG. 1 shows a DMR TDMA frame in a direct mode. In the direct mode, communication terminals communicate with each other directly without transfer stations. As shown in FIG. 1, a DMR TDMA frame includes two time slots that are completely the same, wherein the length of each time slot is 30 ms, and it is further divided into two loads with the same length via a centered synchronization pattern field. A protection interval of 1.25 ms is provided at two ends of each time slot, thus an interval of 2.5 ms exists between the two time slots.

However, because in DMR standard, it is not further defined how two time slots in a frame are used to simultaneously support two independent voice calls in the direct communication mode (shorted as "direct mode" below), the existing private network communication terminals based on DMR standard can only carry out a voice call by using one time slot in a frame. FIG. 2 is a schematic diagram showing an application environment 200 of a private network communication terminal based on DMR standard. As shown in FIG. 2, there are a plurality of private network communication terminals 202~208 in the application environment 200. The private network communication terminal 202 is carrying out a voice call with the private network communication terminal 204. Although the voice call between the private network communication terminal 202 and the private network communication terminal 204 only occupies one time slot of a DMR TDMA frame, the private network communication terminal 206 and the private network communication terminal 208 in the same geographic area cannot carry out a voice call with the other time slot.

The reason for above problem lies in that, although the voice call between the private network communication terminal 202 and the private network communication terminal 204 only occupies one time slot, other private network communication terminals in the same geographic area cannot determine in advance which time slot is an unoccupied time slot because the location of the occupied time slot is not fixed (that is, the occupied time slot may be the first time slot in the DMR TDMA frame or the last time slot in the DMR TDMA frame and the occupied time slot is selected and used by the responding party of the voice call at random). Thus, no new voice calls can be initiated.

Therefore, a technical solution that can overcome the defects in the prior art is needed.

SUMMARY OF THE INVENTION

The present invention intends to provides a private network communication terminal and a method for realizing voice communication so as to solve the above problem in which the location of an unoccupied time slot cannot be determined in advance because the location of the occupied time slot is not fixed and thus another independent voice call cannot be initiated by using the other time slot.

The present invention provides at least the following technical solutions.

A private network communication terminal adapted to respond to a private network communication and initiate a private network communication in a direct mode, comprising a receiver and a transmitter, wherein, the private network communication terminal further comprises:
an intercepting module, connected with the receiver and the transmitter and adapted to:
determine a time slot occupied by the private network communication which is received by the receiver, and control the transmitter to respond to the private network communication received via the time slot; and
intercept an idle time slot and control the transmitter to initiate the private network communication via the idle time slot intercepted.

In the private network communication terminal of the invention, wherein,
the receiver is adapted to receive the private network communication based on DMR standard; and
the transmitter is adapted to respond to the private network communication received and initiate a private network communication according to the DMR standard.

In the private network communication terminal of the invention, the intercepting module is adapted to intercept an idle time slot in a DMR TDMA frame.

In the private network communication terminal of the invention, the intercepting module is adapted to intercept the idle time slot in the DMR TDMA frame in a carrier interception mode.

In the private network communication terminal of the invention, when the DMR TDMA frame is not intercepted by the intercepting module, the intercepting module is adapted to control the transmitter to directly initiate the private network communication.

The invention further provides a method of a private network communication for responding to a private network communication and initiating a private network communication in a direct mode, comprising:
determining a time slot occupied by the private network communication received, and responding to the private network communication via the time slot; and
intercepting an idle time slot and initiating the private network communication via the idle time slot intercepted.

In the method of the private network communication of the invention,
the step of responding to the private network communication received comprises responding to the private network communication received according to DMR standard; and the step of initiating the private network communication further comprises initiating the private network communication according to the DMR standard.

In the method of the private network communication of the invention:

the step of intercepting an idle time slot comprises intercepting an idle time slot in a DMR TDMA frame.

In the method of the private network communication of the invention, the step of intercepting the idle time slot in the DMR TDMA frame further comprises intercepting the idle time slot in the DMR TDMA frame in the carrier interception mode.

The method of the private network communication of the invention further comprises the following step: initiating the private network communication directly when the DMR TDMA frame is not intercepted.

The technical solutions of the invention at least bring about the following beneficial effects. The responding party of the private network communication makes a response with the time slot occupied by the private network communication received, thus the private network communication can be performed with the time slot at a fixed location in a DMR TDMA frame. Hence, other private network communication terminals that do not participate in the private network communication can determine an unoccupied time slot in advance, and can initiate a new private network communication with the unoccupied time slot. Therefore, the utilization of channel can be improved.

BRIEF DESCRIPTION OF THE DRAWINGS

The invention will now be further illustrated in conjunction with the drawings and embodiments, in the drawings.

DETAILED DESCRIPTION OF THE EMBODIMENTS

In order to make the above objects, technical solutions and advantages of the invention more apparent, the invention will now be further illustrated in detail in conjunction with the drawings and embodiments. It is noted that the embodiments described herein are only used to explain the invention, rather than limiting the scope of the invention.

Figure 1:
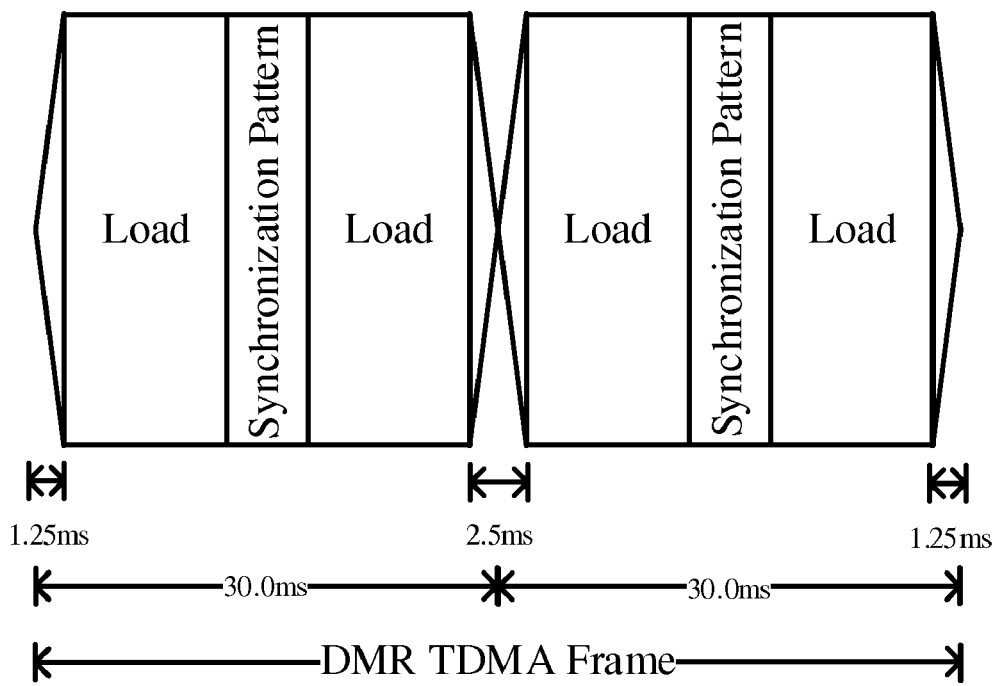
FIG. 1 shows an existing DMR TDMA frame.
Figure 2:
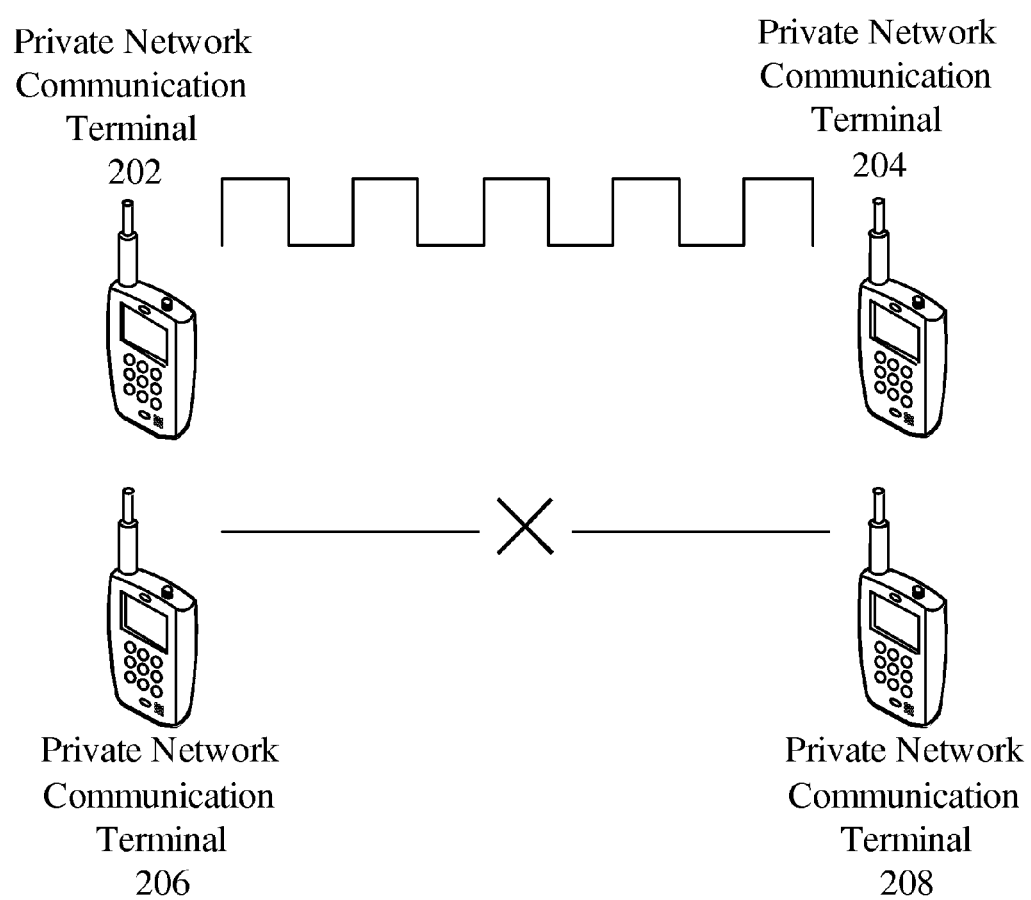
FIG. 2 is a schematic diagram showing an application environment of an existing private network communication terminal based on DMR standard.
Figure 3:
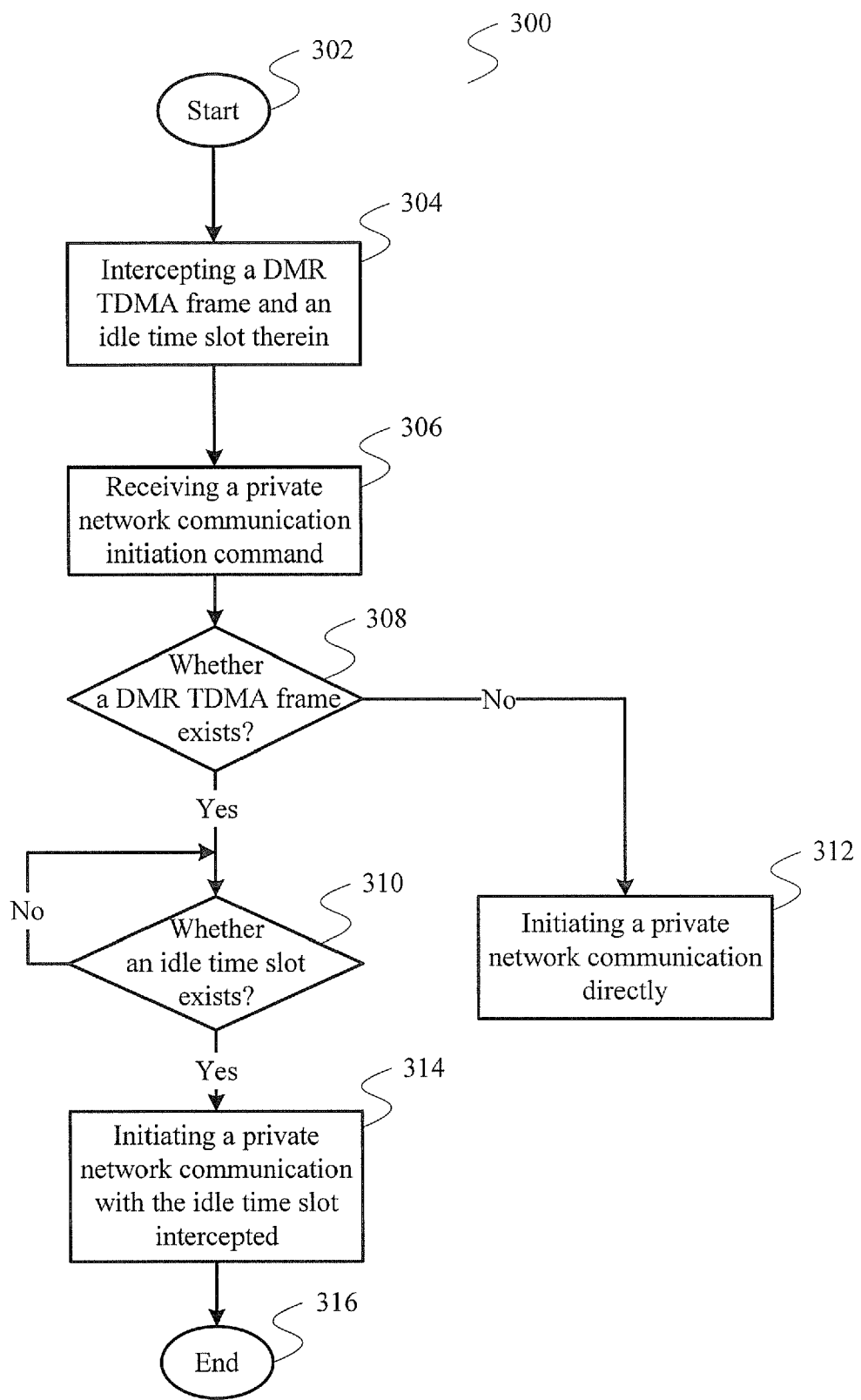
FIG. 3 is a flow chart showing a method for initiating a private network communication according to one preferred embodiment of the invention.

FIG. 3 is a flow chart showing a method 300 for initiating a private network communication according to one preferred embodiment of the invention. As shown in FIG. 3, the method 300 starts at an initial step 302, in which a private network communication terminal for initiating a private network communication is powered on.

Subsequently, in the next step 304, a DMR TDMA frame and an idle time slot therein are intercepted. When a private network communication terminal in a geographic area initiates a private network communication, a DMR TDMA frame is issued and the carrier that carries the DMR TDMA frame is received by all private network communication terminals in the geographic area simultaneously. Particularly, the carrier that carries the DMR TDMA frame may be intercepted and the idle time slot in the DMR TDMA frame may be determined in the following modes, for example, but not limited to, RSSI (Receive Signal Strength Indicator) detection, carrier interception and so on. For example, firstly, synchronization may be established according to a synchronization pattern so as to distinguish each time slot; then, RSSI detection or carrier interception is performed on each time slot so as to determine the idle time slot therein.

Subsequently, in the next step 306, a call initiation command is received, for example, it is detected that a conversation button on the private network communication terminal is pressed.

Subsequently, in the next step 308, it is judged whether a DMR TDMA frame exists, that is, whether a carrier that carries a DMR TDMA frame is intercepted; if yes, the flow turns to step 310; otherwise, turns to step 312.

As described above, if it is determined in step 308 that the DMR TDMA frame exists, the flow turns to step 310. In step 310, it is judged whether an idle time slot exists in the DMR TDMA frame; if yes, the method turns to step 314; otherwise, step 312 is repeated till an idle time slot is intercepted in the DMR TDMA frame.

As described above, in step 312, if it is determined that an idle time slot exists in the DMR TDMA frame, the method turns to step 314. In step 314, a private network communication is initiated by using the idle time slot intercepted, and then the method turns to step 316.

As described above, if it is determined in step 308 that no DMR TDMA frame exists, the method turns to step 312. In step 312, a private network communication is initiated directly, that is, a private network communication is initiated according to the standard direct transmission mode defined in DMR standard; and then, the method turns to step 316.

Finally, the method 300 ends at step 316.

It can be seen from the above method 300 provided by the invention that, in the direct mode, during the initiation of the private network communication, an idle time slot in a DMR TDMA frame is intercepted and then a private network communication is initiated via the idle time slot intercepted. Thus, one idle time slot may be used to initiate a new private network communication when the other time slot in the DMR TDMA frame is occupied, thereby it can be realized that private network communications are carried out with the two time slots in a DMR TDMA frame simultaneously.

However, when one time slot in the DMR TDMA frame is occupied, in the case that the other idle time slot in the DMR TDMA frame is to be used to initiate a new private network communication, it is further required that one private network communication only occupies one time slot. Only under such a condition, a private network communication terminal that does not participate in the private network communication can intercept an idle time slot in the DMR TDMA frame (i.e., the next time slot after the occupied time slot is the idle time slot) by determining the occupied time slot (i.e., establishing a synchronization with the occupied time slot), and then a new private network communication is initiated with the idle time slot. By reading the description below illustrated in conjunction with FIG. 4, it can be found that, the time slot used for responding to the private network communication received is the time slot occupied by the private network communication received. Therefore, it is guaranteed that one private network communication will only occupy one time slot.

Figure 4:
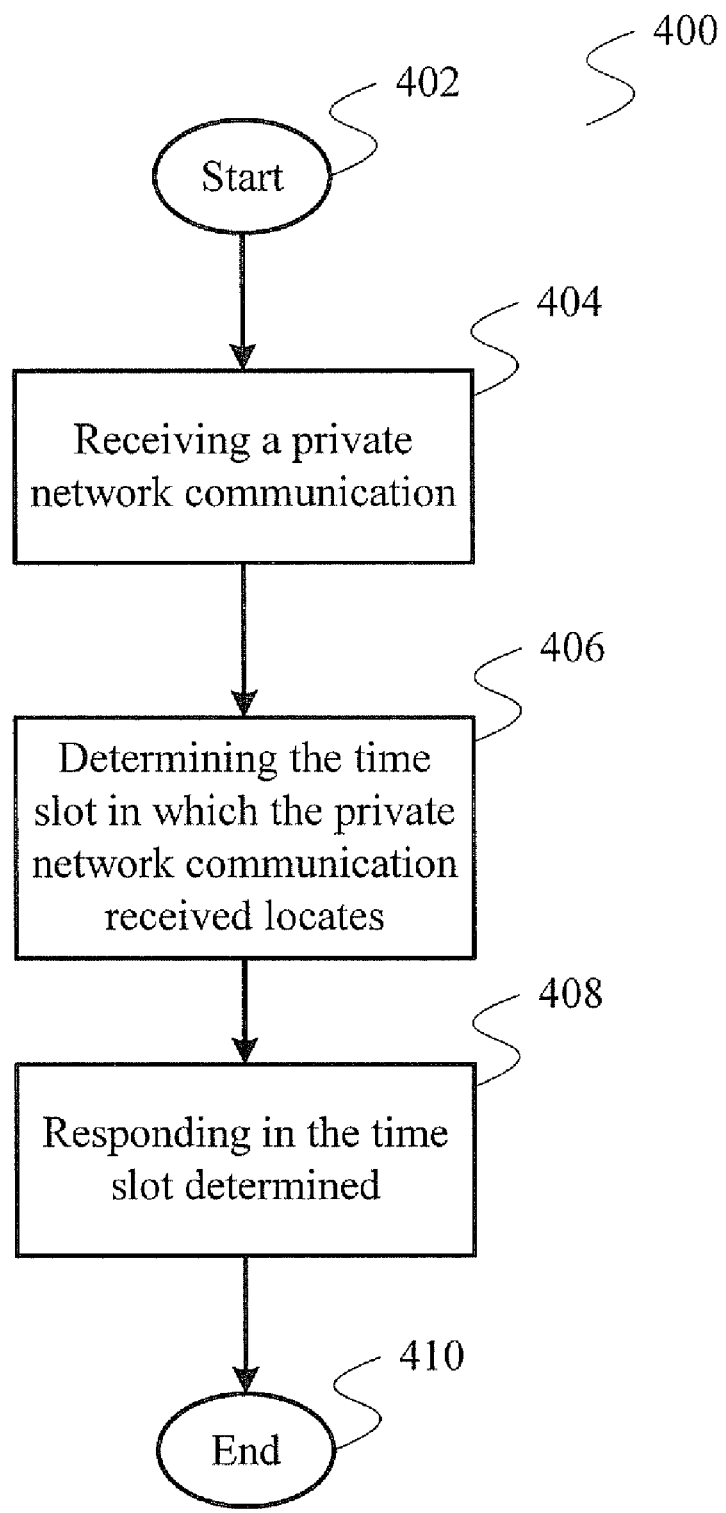
FIG. 4 is a flow chart showing a method for responding to a private network communication according to one preferred embodiment of the invention.

Before describing the technical solution shown in FIG. 4, it is noted that, responding to a private network communication received as shown in FIG. 4 includes issuing, by a private network communication terminal that is the receiving party of the private network communication data, calling data as a response in the time period of Call Hangtime after receiving the private network communication. However, for the calling data issued after the time period of Call Hangtime, the private network communication initiated will be processed in accordance with the method shown in FIG. 3. Meanwhile, responding to a private network communication received herein includes responding to the private network communication received by the calling and called parties during the private network communication process. The method for responding to a private network communication will be described in conjunction with FIG. 4 as below.

FIG. 4 is a flow chart showing a method for responding to a private network communication according to one preferred embodiment of the invention. As shown in FIG. 4, method 400 starts at step 402.

Subsequently, in the next step 404, a private network communication is received. For example, a DMR TDMA frame that carries a private network communication is intercepted by a private network communication terminal, and the private network communication terminal is determined as the called party of the private network communication by checking the link control information. Then, the private network communication terminal receives the private network communication.

Subsequently, in the next step 406, the time slot in which the private network communication received exists is determined, that is, it is determined via which time slot in the DMR TDMA frame the private network communication received is transferred.

Subsequently, in the next step 408, during the time period of Call Hangtime, a response is made in the time slot determined in step 406.

Finally, method 400 ends at step 410.

It can be seen from FIG. 4 that, during the private network communication, the calling and called parties carry out the private network communication with the same time slot in a DMR TDMA frame all the time, and the time slot is the time slot used by the call initiating party initially to initiate the call. When the calling and called parties use the same time slot in the DMR TDMA frame to carry out the private network communication, private network communication terminals that do not participate in the private network communication can intercept an idle time slot in the DMR TDMA frame by determining the occupied time slot and then initiate a new call with the idle time slot.

According to the above description illustrated in conjunction with FIG. 3 and FIG. 4, it is summarized that, in the method for realizing private network communication provided by the invention, when a response is made to a private network communication received, the time slot occupied by the private network communication received is determine firstly, and then the private network communication received is responded via the time slot determine; and before a private network communication is initiated, an idle time slot is intercepted and then the private network communication is initiated via the idle time slot intercepted. Because the calling and called parties carry out the private network communication with the same time slot in a DMR TDMA frame all the time, private network communication terminals that do not participate in the private network communication can intercept an idle time slot in the DMR TDMA frame by determining the occupied time slot and then initiate a new call with the idle time slot.

The method for realizing private network communication provided by the invention will now be described in detail in conjunction with the application environment shown in FIG. 5.

Figure 5:
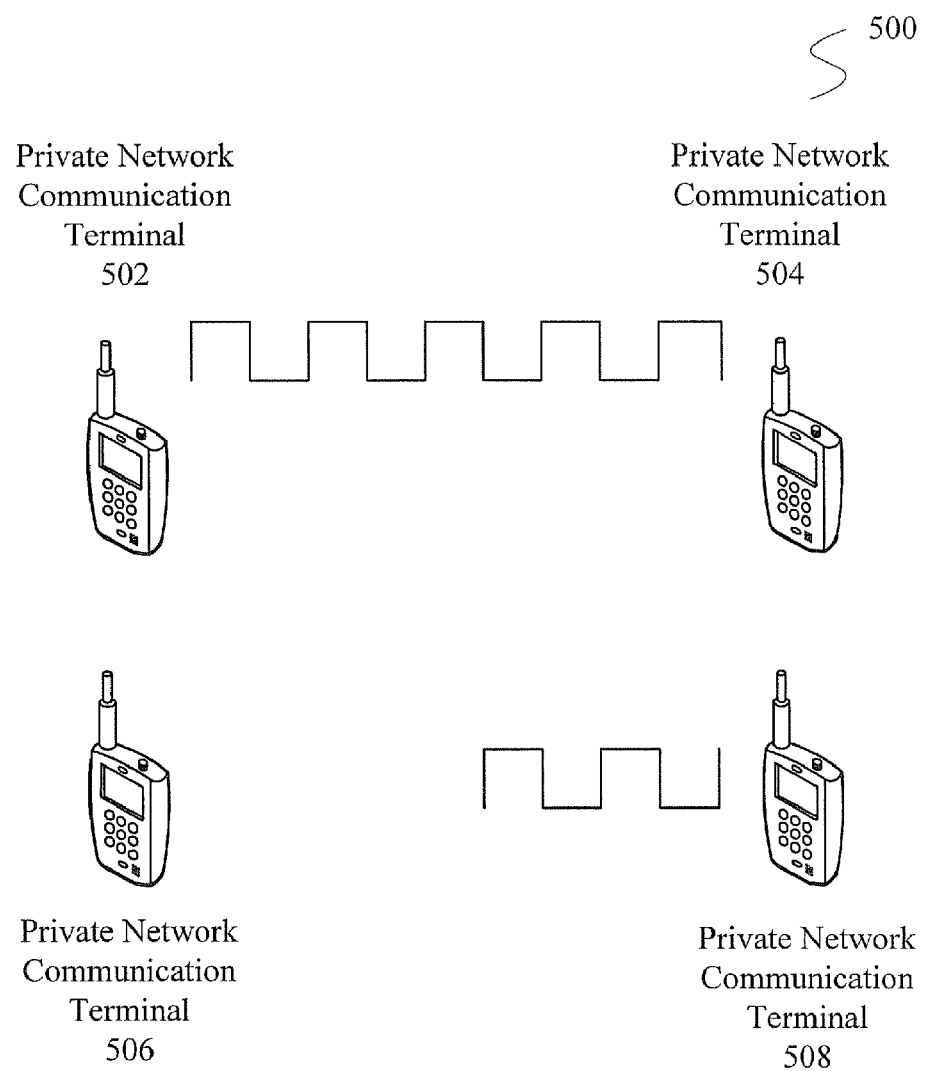
FIG. 5 is a schematic diagram showing an application environment according to one preferred embodiment of the invention.

FIG. 5 is a schematic diagram showing an application environment according to one preferred embodiment of the invention. As shown in FIG. 5, in the application environment 500, a plurality of private network communication terminals in the same geographic area are shown, for example, private network communication terminals 502~508. The process for realizing the private network communication among these private network communication terminals 502~508 is described below.

First of all, the private network communication terminal 502 intends to initiate a private network communication to the private network communication terminal 504. Assuming that no DMR TDMA frame is intercepted by private network communication terminal 502 at this time, the private network communication terminal 502 initiates a private network communication directly as described in the above method 300. Subsequently, the DMR TDMA frame that carries the private network communication is received by the private network communication terminals 504~508 simultaneously.

Subsequently, the private network communication terminal 504 is determined as the called party of the private network communication initiated by private network communication terminal 502. Thus, the private network communication terminal 504 receives the private network communication and determines the time slot occupied by the private network communication. Then, the private network communication terminal 504 responds to the private network communication with the time slot in the time period of Call Hangtime.

Subsequently, the private network communication terminal 502 receives a private network communication issued by private network communication terminal 504 as a response and determines the time slot occupied by the private network communication. Then, the private network communication terminal 502 responds to the private network communication with the time slot in the time period of Call Hangtime. This process is repeated till the private network communication between private network communication terminals 502~504 is terminated.

Assuming that, the private network communication terminal 506 intends to initiate a private network communication to the private network communication terminal 508 during the process in which a private network communication is carried out between private network communication terminals 502~504. Because the DMR TDMA frame issued by the private network communication terminal 502 when initiating a private network communication will be received by the private network communication terminals 504~508 simultaneously, the private network communication terminal 506 can determine the time slot occupied by the private network communication between private network communication terminals 502~504 and initiate a call to the private network communication terminal 508 with an unoccupied time slot in the DMR TDMA frame. After receiving the private network communication initiated by the private network communication terminal 506, the process in which the private network communication terminal 508 responds is the same as the process in which the private network communication terminal 504 responds.

It can be seen from the above that, according to the method for realizing private network communication provided by the invention, private network communications can be carried out with two time slots in a TDMA frame simultaneously based on the DMR standard.

In addition to the above method for initiating and responding to a private network communication, the invention further provides a private network communication terminal that can initiate and respond to a private network communication with the above method. The private network communication terminal will now be described in detail in conjunction with FIG. 6.

Figure 6:
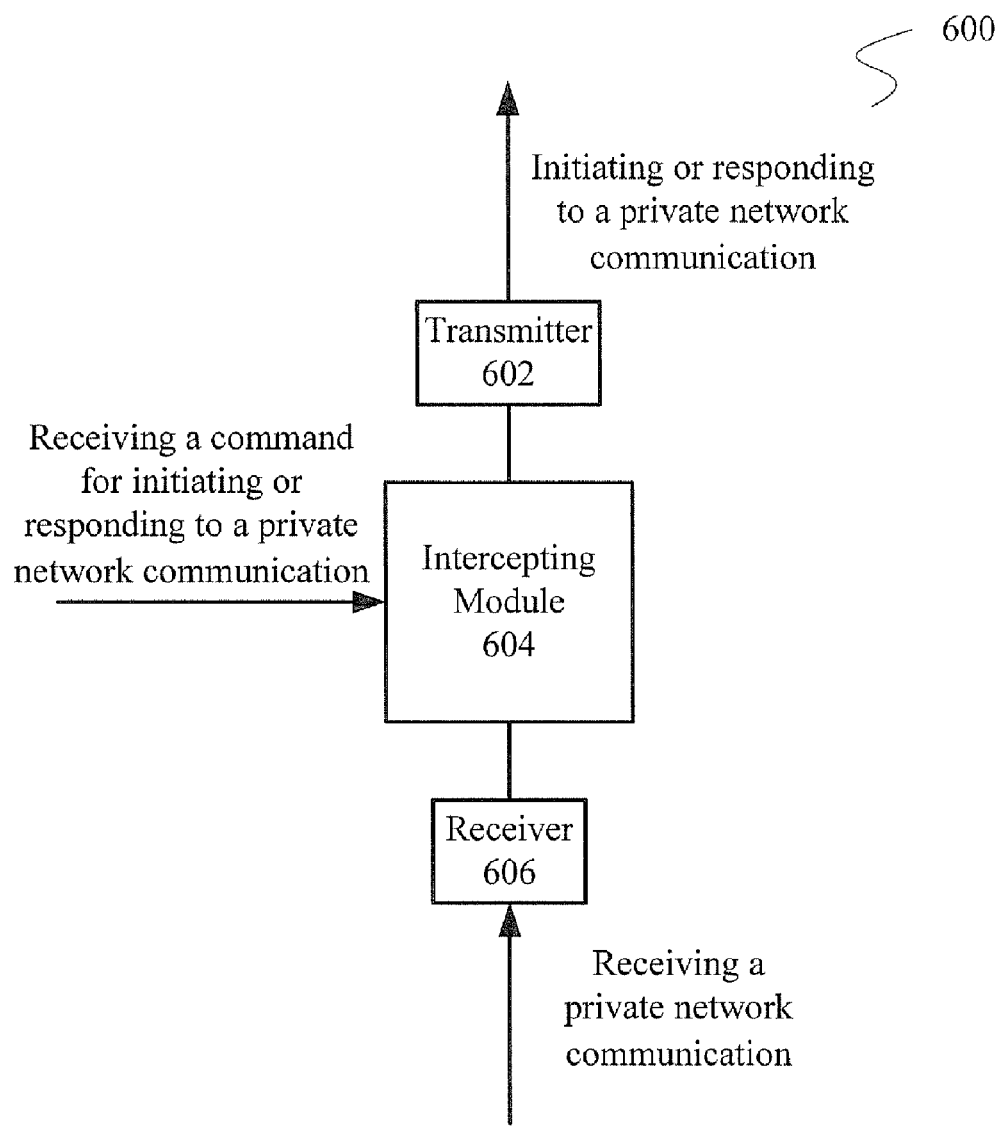
FIG. 6 is a structural diagram showing a private network communication terminal according to one preferred embodiment of the invention.

FIG. 6 is a structural diagram showing a private network communication terminal according to one preferred embodiment of the invention. As shown in FIG. 6, a private network communication terminal 600 includes a transmitter 602, an intercepting module 604 and a receiver 606. Wherein, the intercepting module 604 is connected in communication with the transmitter 602 and the receiver 606 respectively.

The functions of transmitter 602 and receiver 606 are well known in the art and repeated descriptions thereof are omitted herein.

After the receiver 606 receives a private network communication, the intercepting module 604 determines a time slot in which the private network communication received by receiver 606 exists, and controls the transmitter 602 to respond to the private network communication received via the time slot determined.

Additionally, intercepting module 604 is further adapted to intercept a DMR TDMA frame and an idle time slot therein. For example, the intercepting module 604 can perform RSSI detection or carrier interception via the receiver 606 so as to intercept whether a TDMA frame exists and to determine an idle time slot therein. When a private network communication is initiated, if no DMR TDMA frame exists, the intercepting module 604 can control the transmitter 602 to initiate a private network communication directly; and if a DMR TDMA frame exists, the intercepting module 604 can control the transmitter 602 to initiate a private network communication via a intercepted idle time slot in the DMR TDMA frame.

It should be noted that, although each of the above embodiments is described according to DMR standard, those skilled in the art can understand that the technical solutions provided by the invention can also be applied to a solution in which a private network communication is realized based on other standards except for DMR standard.

The above descriptions are only preferred embodiments of the invention rather than limiting the scope of the invention; and various modifications and variations can be made without departing from the spirit or scope of the invention as defined by the appended claims and their equivalents.

The invention claimed is:

1. A private network communication terminal adapted to respond to a private network communication and initiate a private network communication in a direct mode, comprising:
   a receiver;
   a transmitter; and
   an intercepting processor, connected with the receiver and the transmitter and adapted to:
   determine a time slot occupied by the private network communication and received by the receiver, and control the transmitter to respond to the private network communication received via the time slot; and
   control the transmitter to initiate the private network communication via an idle time slot of two time slots in a Gigistal Mobile Radio Time Division Multiple Access (DMR TDMA) frame when the two time slots in the DMR TDMA frame in a direct mode are intercepted and one of the two time slots is intercepted as idle.

2. The private network communication terminal according to claim 1, wherein:
   the receiver is adapted to receive the private network communication based on DMR standard; and
   the transmitter is adapted to respond to the private network communication received and initiate a private network communication according to the DMR standard.

3. The private network communication terminal according to claim 1, wherein, the intercepting processor is adapted to intercept the idle time slot in the DMR TDMA frame in a carrier interception mode.

4. The private network communication terminal according to claim 3, wherein, when the DMR TDMA frame is not intercepted by the intercepting processor, the intercepting processor is adapted to control the transmitter to directly initiate the private network communication.

5. A method of a private network communication for responding to a private network communication and initiating a private network communication in a direct mode, comprising:
   determining a time slot of two time slots in a Digital Mobile Radio Time Division Multiple Access (DMR TDMA) frame in a direct mode, which is occupied by the private network communication received, and responding to the private network communication via the time slot; and
   initiating the private network communication an idle time slot of the two time slots in the DMR TDMA frame when the two time slots in the DMR TDMA frame in the direct mode are intercepted and one of the two time slots is intercepted as idle.

6. The method of the private network communication according to claim 5, wherein:
   the step of responding to the private network communication received comprises responding to the private network communication received according to DMR standard; and
   the step of initiating the private network communication further comprises initiating the private network communication according to the DMR standard.

7. The method of the private network communication according to claim 5, wherein, the step of intercepting the idle time slot in the DMR TDMA frame further comprises intercepting the idle time slot in the DMR TDMA frame in a carrier interception mode.

8. The method of the private network communication according to claim 7, further comprising: initiating the private network communication directly when the DMR TDMA frame is not intercepted.

* * * * *